United States Patent
Gretz

(10) Patent No.: US 6,452,098 B1
(45) Date of Patent: Sep. 17, 2002

(54) TERMINAL DEVICE FOR LOW-VOLTAGE CABLE SYSTEM

(75) Inventor: Thomas J. Gretz, Clarks Summit, PA (US)

(73) Assignee: Arlington Industries, Inc., Scranton, PA (US)

(*) Notice: Subject to any disclaimer, the term of this patent is extended or adjusted under 35 U.S.C. 154(b) by 0 days.

(21) Appl. No.: 09/852,852

(22) Filed: May 10, 2001

(51) Int. Cl.[7] ............................................... H01R 13/46
(52) U.S. Cl. ........................ 174/59; 174/66; 174/67; 220/241; 33/528
(58) Field of Search ............................. 174/54, 58, 59, 174/60, 66, 67, 57; 220/241, 242; 33/DIG. 10, 528

(56) References Cited

U.S. PATENT DOCUMENTS

| | | | | |
|---|---|---|---|---|
| 1,265,744 A | * | 5/1918 | Canfield ...................... | 174/58 |
| 4,063,660 A | * | 12/1977 | Inare .......................... | 220/3.6 |
| 4,134,636 A | * | 1/1979 | Kleinatland et al. ...... | 174/58 X |
| 4,599,485 A | * | 7/1986 | Smolik ........................ | 174/57 |
| 5,630,281 A | * | 5/1997 | Pledger et al. ..... | 33/DIG. 10 X |
| 6,055,736 A | * | 5/2000 | Gaston ........................ | 33/528 |
| 6,166,329 A | * | 12/2000 | Oliver et al. ................ | 174/58 |
| 6,317,995 B1 | * | 11/2001 | Hoffman, Jr. ............... | 33/528 |

* cited by examiner

Primary Examiner—Dean A. Reichard
Assistant Examiner—Dhiru R Patel

(57) ABSTRACT

This invention is a terminal or junction device for a low-voltage linear distribution system. A rectangular mounting plate has mounting ears at the corners thereof and stop posts extending rearwardly to locate and fasten the device against a wall stud. A flange extends forwardly from the mounting plate to surround the opening in the wall and provide bosses for fastening a system device to the terminal device. The invention may be installed in the roughing out phase of new construction. After the interior wall is installed and a system device is hooked up, screwing down the faceplate brings the terminal device into firm contact with the back of the wall for a secure, tight installation.

8 Claims, 2 Drawing Sheets

TERMINAL DEVICE FOR LOW-VOLTAGE CABLE SYSTEM

This invention is a terminal device for use in low-voltage cable systems.

Refer to the patent application ONE-PIECE TERMINAL DEVICE FOR LOW-VOLTAGE CABLE SYSTEM filed the same day as the present application with the same inventor and assignee.

There are several approaches to installing communication cable, television cable, fiber optic cable or similar low-voltage cable or wire in new construction. Many devices for providing terminals and junctions for the cable are commercially available. Most generally such devices consist of a metal or plastic rectangular box which may be attached to a stud or other structural member during the roughing-out phase of construction. Such a device has an open side that usually faces the interior of the structure once installed. Upon installation of the interior wall a hole is cut in the wall material to allow access to the open side of the box. While such an arrangement can provide a satisfactory installation it is not uncommon for such boxes to move forward relative to the wall material upon fastening of the faceplate because there exists no means to bring the box in secure contact with the rear of the wall material. While such boxes will not move relative to the structural member to which they are attached, they can and will move relative to the wall material.

SUMMARY OF THE INVENTION

The present invention is a terminal or junction device for a low-voltage linear distribution system such as a television system. The device includes an open mounting plate in a plane generally parallel to and in contact with a subsequently installed wall. The mounting plate has ears for attachment to a wall stud. The mounting plate has a flange perpendicular thereto and extending forwardly which will extend through the wall and surround the wall opening. The depth of the flange will be equal to the thickness of the wall for the most secure fit. Upon installation of a system device such as a cable outlet and application of a faceplate, as described more completely below, the surface of the mounting plate is drawn snugly against the rear of the wall when the faceplate mounting fasteners are tightened. A tie-off strap on the flange may be used to tie off cable.

DESCRIPTION OF THE PREFERRED EMBODIMENT

Figure 2:
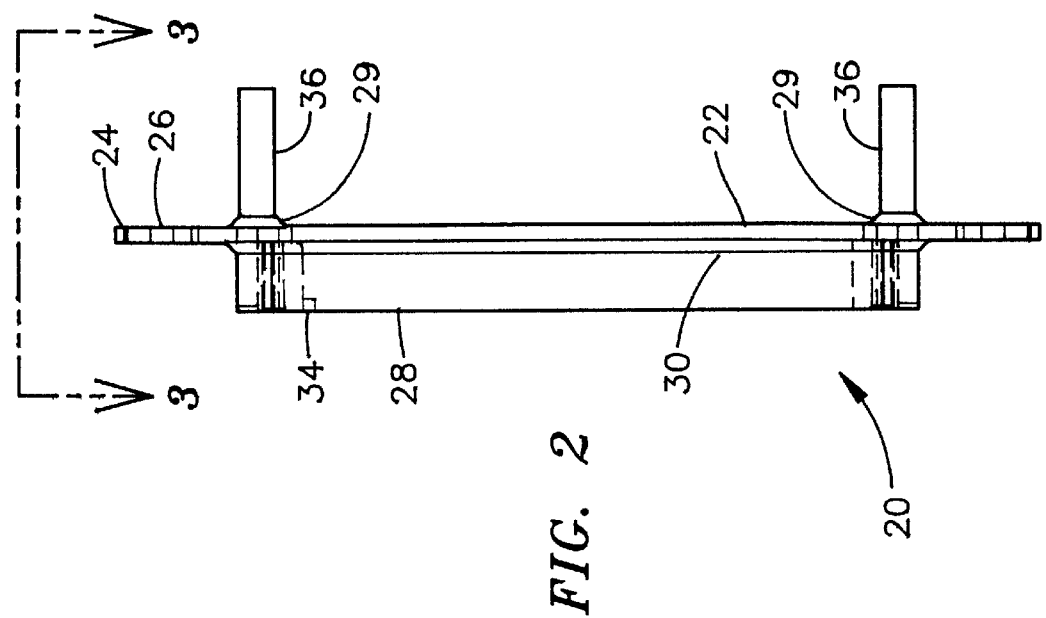
FIG. 2 is a side view of the terminal device in the direction 2—2 of FIG. 1.

The terminal or junction device of the present invention is used in the roughing-out phase of construction. It is installed when structural members are in place but before the interior walls are installed. While the device of the present invention may be referred to herein as a terminal device it is to be understood that it may serve as either a terminal or a junction device.

There is shown a terminal device 20 consisting of a generally rectangular mounting plate 22 having mounting ears 24 in the same plane as the mounting plate 22. Any number of mounting ears 24 may be provided. Three are shown so that the device 20 may be mounted with its long axis either horizontal or vertical. The mounting ears 24 have openings 26 to accommodate fasteners such as nails or screws.

Extending forwardly from the mounting plate 22 at essentially a right angle thereto is mounting flange 28. The flange 28 is of a depth essentially equal to the thickness of the wall material with which the device will be used. A fillet 30 is provided between the flange 28 and the mounting plate 22 to eliminate a stress raiser. Fillets 29 and 31 serve the same purpose for the corners of the flange 28 and the bottoms of the stop posts 36 as described below.

Bosses 32 on the ends of the flange 28 have openings for attachment of a system device such as a cable outlet with a faceplate, not shown. A tie-off strap 34 is shown extending from one boss 32 to the flange 28 at one side of the device. This strap 34 provides a means for tying off the ends of cable which is being run to the terminal device 20. Any number of tie-off straps 34 may be provided and they may be located at other places, such as across the corners of the flange 28.

Figure 3:
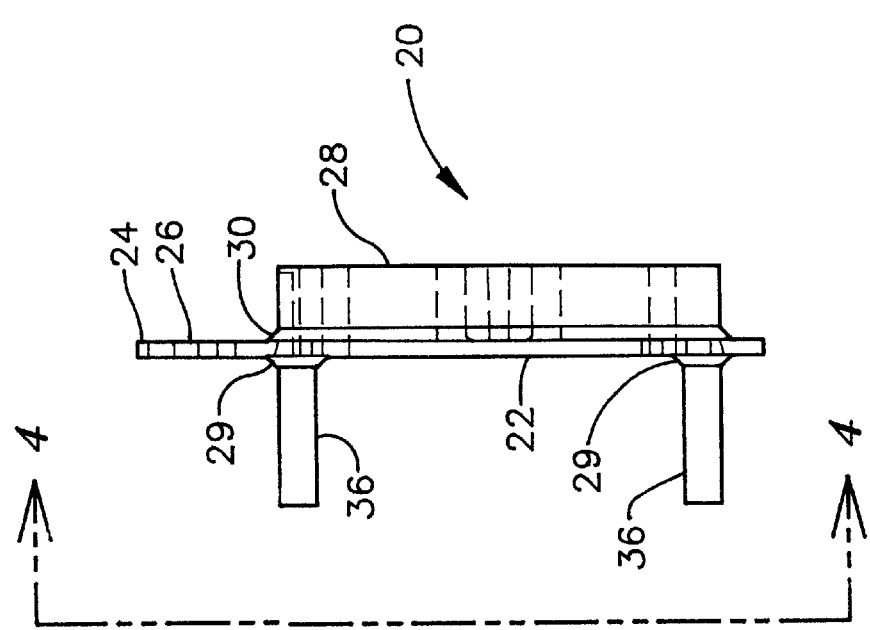
FIG. 3 is a top view of the terminal device in the direction 3—3 of FIG. 2.

On the rear face of the mounting plate 22, as especially seen in FIGS. 2 and 3, are stop posts 36 extending from the four corners. These posts 36 serve as stops to locate the mounting plate against the wall stud to which it is being mounted as more fully described below. Although it is not necessary to use posts at each corner, this arrangement is most convenient since it allows the mounting plate 22 to be oriented either horizontally or vertically against a wall stud.

The terminal device of the present invention would be used as follows: In new construction, in the roughing-out phase before wall material is installed, the terminal device 20 would be fastened to a wall stud. For vertical installation the terminal device 20 is held against a wall stud with stop posts 36 against the inside face of the stud and the two mounting ears 24 on the long side of the device flat against the outside face of the stud. If installation is desired on the other side of the stud, the device 20 is merely turned in its own plane 180°. Fasteners such as nails or screws are driven through the openings 26 in the mounting ears 24 into the outside face of the wall stud to hold the terminal device 20 in place.

For horizontal installation the stop posts 36 on the short side of the terminal device 20 would be held against the inside face of the stud and fasteners driven through the mounting ears 24 on the short side into the outside face of the stud. The cable destined for this device may then be tied to the tie-off strap 34. Wall material may then be applied to the wall, leaving an opening. to surround flange 28 of the terminal device 20. At this time a system device such as a cable outlet [not shown] may be connected to the cable which has been tied off at the terminal device. The system device may then be mounted to the terminal device 20, for example by screws through the system device into bosses 32. A faceplate may then be installed over the system device by usual means such as screws through the faceplate into the system device. The faceplate screws are then tightened such that the faceplate pushes the wall material into tight contact with the face of mounting plate 22 which in turn is rigidly attached to wall stud 60, thus making a tight, secure installation.

The terminal device shown and claimed here may be used for roughing out terminals in any number of different low-voltage linear distribution systems, such as television coaxial cable, sound systems, inter communication systems and fiber optic cable systems. The device is relatively cheap to manufacture, especially when molded of plastic. Installation of the device is simple and quick.

Figure 1:
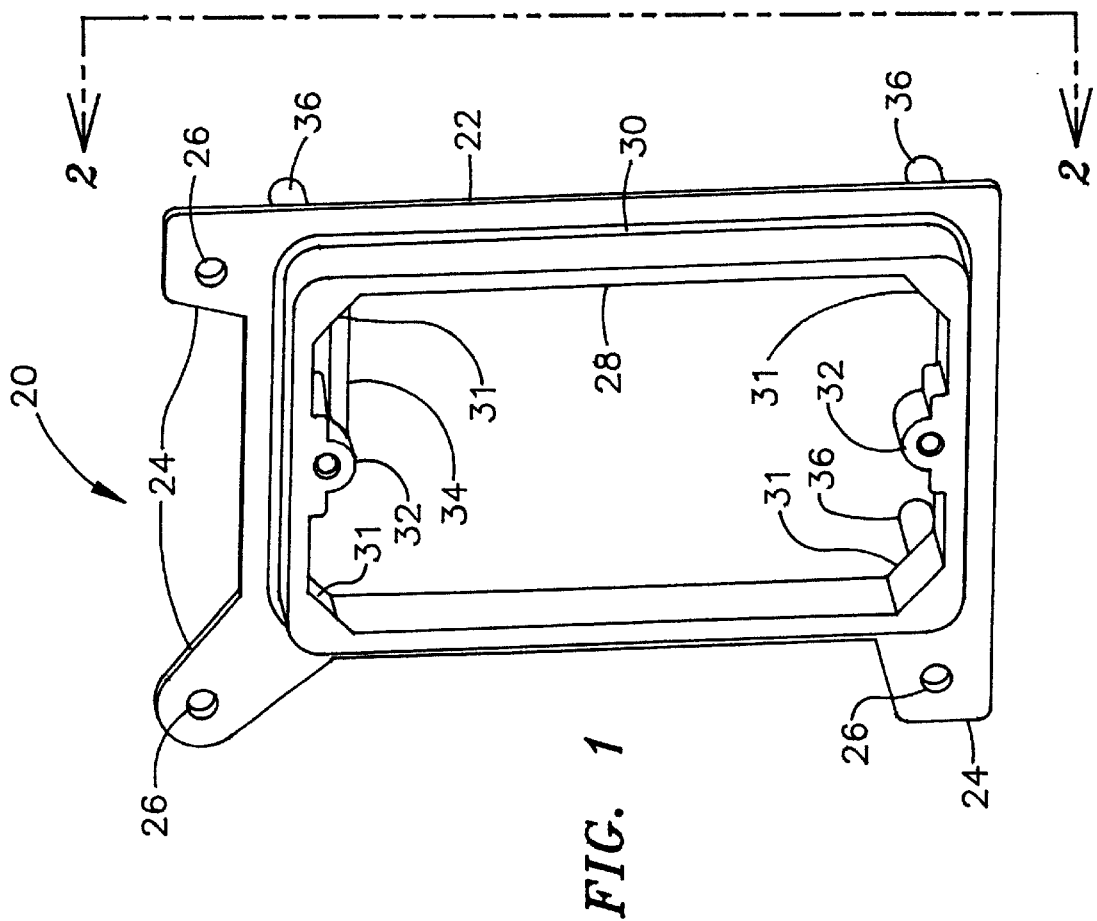
FIG. 1 is a perspective view showing the front of the terminal device.
Figure 4:
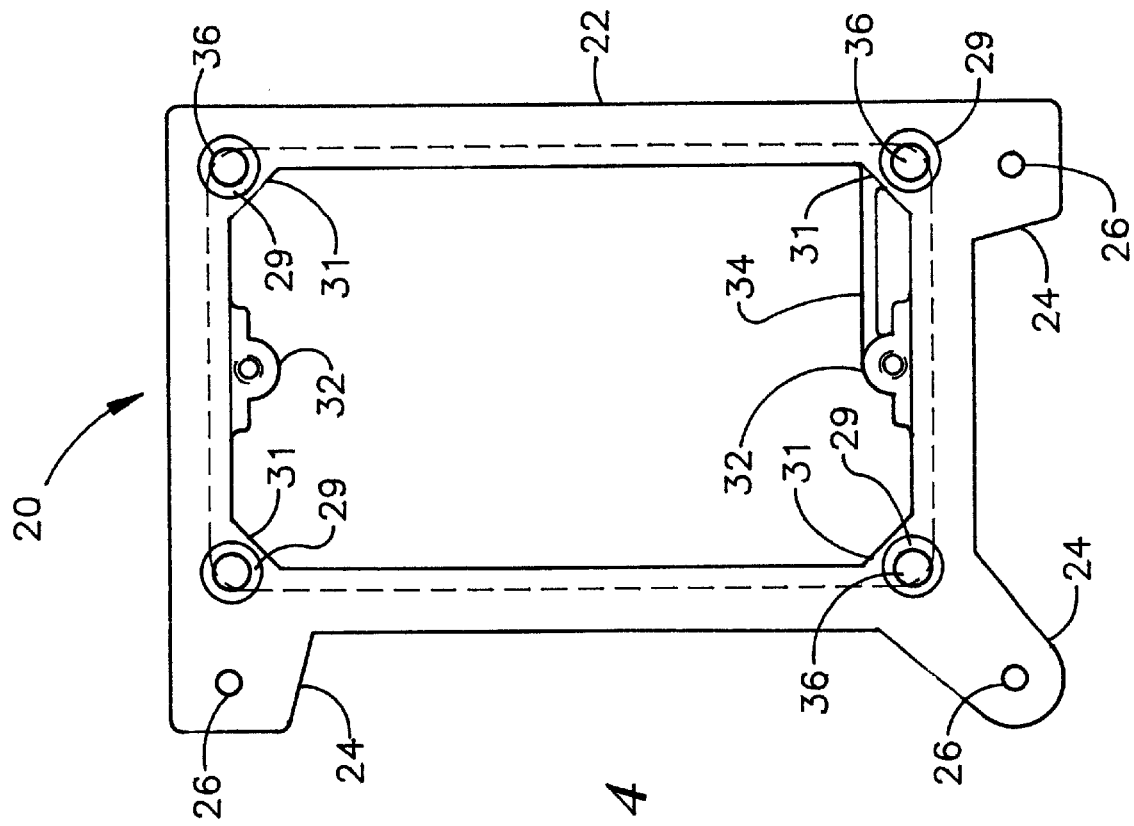
FIG. 4 is a plan view of the rear of the terminal device in the direction 4—4 of FIG. 3.

While the terminal device 20 is molded of plastic in the preferred embodiment, it would be possible to make it by other means, such as stamping it from steel plate, at least in the form shown in FIG. 1. Also two or more such terminal devices could be ganged in one piece according to the principles of this invention.

While there has been illustrated and described a particular embodiment of the present invention, it will be appreciated that numerous changes and modifications will occur to those skilled in the art. It is intended in the appended claims to cover all such changes and modifications which fall within the true spirit and scope of the present invention.

I claim:

1. A terminal device for low-voltage cable systems comprising:
   a generally rectangular mounting plate having a generally rectangular opening therein with a mounting ear at one or more corners thereof;
   a flange extending forwardly from the mounting plate at the periphery of said rectangular opening;
   a boss on at least one end of the flange for receiving fasteners;
   a stop post extending rearwardly from each of at least two corners of the mounting plate.

2. The one-piece terminal device for low-voltage cable systems of claim 1 in which the device is made of molded plastic.

3. The one-piece terminal device for low-voltage cable systems of claim 1 in which the device is made of metal.

4. The one-piece terminal device for low-voltage cable systems of claim 1 in which a mounting ear is located at each of three corners of the mounting plate.

5. The one-piece terminal device for low-voltage cable systems of claim 4 in which the mounting ears are extensions of the mounting plate and have openings therein for fasteners.

6. The one-piece terminal device for low-voltage cable systems of claim 5 in which said boss is located in the center of each short end of the mounting plate.

7. The one-piece terminal device for low-voltage cable systems of claim 6 in which said stop post is located at each corner of the mounting plate.

8. A terminal or junction device for a low-voltage cable distribution system comprising:
   a rectangular mounting plate having a rectangular opening therein and having mounting ears extending from the mounting plate at three corners thereof, the mounting ears having fastener openings therein,
   a flange extending forwardly from the mounting plate at the periphery of the rectangular opening;
   a fastener boss located at the center of each of the short ends of the flange and having fastener openings therein; and
   a stop post at each corner extending rearwardly from the mounting plate.

* * * * *